United States Patent [19]

Furumura

[11] Patent Number: 4,875,263
[45] Date of Patent: Oct. 24, 1989

[54] METHOD OF MANUFACTURING A DYNAMIC PRESSURE TYPE SLIDE BEARING

[75] Inventor: Kyozaburo Furumura, Ninomiya, Japan

[73] Assignee: Nippon Seiko Kabushiki Kaisha, Tokyo, Japan

[21] Appl. No.: 215,031

[22] Filed: Jul. 5, 1988

Related U.S. Application Data

[62] Division of Ser. No. 15,785, Feb. 17, 1987, abandoned.

[51] Int. Cl.⁴ .............................................. B21D 53/10
[52] U.S. Cl. ...................... 29/149.5 S; 29/149.5 NM; 384/297; 384/909
[58] Field of Search ................ 29/149.5 R, 149.5 DP, 29/149.5 S, 149.5 NM; 384/276, 292, 291, 297, 299, 300, 97, 98, 909

[56] References Cited

U.S. PATENT DOCUMENTS 3,342,667  9/1967  Berunghof, Jr. .................... 384/297
4,120,544 10/1978  Hüber ................................. 308/240

Primary Examiner—Timothy V. Eley
Attorney, Agent, or Firm—Arnold S. Weintraub; Gerald R. Black

[57] ABSTRACT

A dynamic pressure type bearing comprising an outer cylindrical member made of metal and a thin walled inner cylindrical member made of synthetic resin and joined to the inner periphery of the outer cylindrical member. The inner periphery of the inner cylindrical member is formed with a plurality of grooves for generating dynamic pressure. The thin walled inner cylindrical member is joined to the inner periphery of the outer cylindrical member during the moulding time by a joining means. The method of making this bearing consists of the steps of: firstly, inserting an outer cylindrical member previously provided with suitable joining means into an outer mould; inserting an inner mould provided with projections into the outer mould; pouring or injecting molten synthetic resinous material into a gap formed between the outer cylindrical member inserted in the outer mould and the inner mould already placed in the outer cylindrical member; and allowing the poured resin material to solidify to form an inner cylindrical member integrally joined to the outer cylindrical member to constitute a composite bearing of laminated outer and inner cylindrical members. The composite bearing is removed from the moulds by moving it in an axial direction away from the moulds. Preferably, the synthetic resin for forming the inner cylindrical member is a thermosetting resin.

14 Claims, 4 Drawing Sheets

METHOD OF MANUFACTURING A DYNAMIC PRESSURE TYPE SLIDE BEARING

This is a division of the application Ser. No. 015,785, filed Feb. 17, 1987, now abandoned.

BACKGROUND OF THE INVENTION

1. Field of the Invention

This invention relates to the field of dynamic pressure type slide bearings and methods of manufacture thereof, and more particularly, to a dynamic pressure type slide bearing in which a metallic outer cylindrical member is integrally joined around a thin walled inner cylindrical member made of synthetic resin having on its bearing bore face a plurality of dynamic pressure generating grooves formed by moulding.

2. Prior Art

Generally, dynamic pressure type slide bearings made of synthetic resin can be readily manufactured by mass production by virtue of the material's good formability. Such mouldings characteristically contact the mating shaft with a fairly low coefficient of friction both during starting and running under low speed. These bearings have been made by the steps of injecting or pouring resilient synthetic resin into a metal mould, and then pulling out the solidified bearing from the metal mould, a step made possible by virtue of the resiliency of the moulded bearing.

However, these synthetic resin bearings have proved to be difficult to mould accurately with respect to both bearing bore size and configuration as a whole. Therefore, they are unsatisfactory for generating the necessary dynamic pressure required for these dynamic pressure type bearings. In addition, due to their high coefficient of thermal expansion, they have poor dimensional stability with respect to bearing bore diameter when subjected to temperature change during operation. Thus, they have not yet been widely applied in actual use.

Conventional dynamic type slide bearings fabricated of synthetic resin, due to the large dimensional variation of the bearing bore diameter and the lack of accuracy in configuration, are liable to have such defects that the face of the bearing bore partially contacts the mating shaft with too strong a force, and/or the action of the grooves for generating dynamic pressure for lubrication becomes nonuniform. Thereby, accuracy of the bearing with respect to bearing run-out, durability and load carrying capacity will become degraded from usage.

In addition, since the conventional bearings vary so greatly in bore diameter and in accuracy of configuration, they cannot be used in applications requiring reduced bearing clearance. Accordingly, their load carrying capacity is low, and the running torque may not be reduced by using low viscosity lubricants. Moreover, since the coefficient of expansion of the bearing bore due to temperature rise during operation is fairly high, bearing clearance of these bearings is inevitably variable.

To make matters even worse, bearings of the conventional type show considerable volumetric shrinkage during moulding. That is, when the synthetic resinous material used therein is cooled, solidified and crystallized, the material shrinks and causes the formed bearing to tightly contact the inner mould. Thus, the corners of the grooves for generating dynamic pressure formed on the bearing bore face are liable to cut into the recessed portions defined between the adjacent ridges of the inner mould for forming the bearing grooves.

A related invention by the same inventor as the inventor of the present invention aims to solve the aforesaid drawbacks and has been filed in Japan as a patent application, published as Laid-Open (unexamined) Patent Publication No. Sho 61(1986)-036516.

SUMMARY OF THE INVENTION

This invention is an improvement of the aforesaid laid-open application. It is intended to carry out the invention in a more effective and economical manner.

In other words, the present invention aims to solve the drawbacks mentioned above. The invention provides a dynamic pressure type slide bearing having high accuracy with respect to both dimension and configuration. The bearing of the present invention comprises a metal outer cylindrical member and a thin walled inner cylindrical member fabricated of a synthetic resin and fixedly joined to and retained on the inner face of the outer cylindrical member. On the bearing bore face of the inner cylindrically member, a plurality of grooves for generating dynamic pressure are provided, and said thin walled inner cylindrical member is secured to the inner face of the outer cylindrical member by means of any suitable joining or bonding means. The dynamic pressure type slide bearing mentioned above is manufactured by a method discussed below.

A metallic outer cylindrical member which has previously been coated with any suitable joining or bonding means is inserted into an outer mould. An inner mould, which has previously been formed thereon with a plurality of projecting ridges corresponding to the shape of grooves for generating dynamic pressure, is placed into an inner bore of the outer cylindrical member. Then suitable, molten moulding material is poured or injected into a gap defined between the inner mould and the outer lubricants. The moulding material is then allowed to solidify to form an inner cylindrical member which is integrally jointed to and retained on the outer cylindrical member, thereby constituting an integrally formed composite structure. The rate of thermal expansion can optionally be set to account for temperature change while in actual use. A method of manufacturing the dynamic pressure type slide bearing is also provided. The formed outer cylindrical member and the inner cylindrical member forming together a composite bearing are removed from both the outer mould and the inner mould by sliding in an axial direction.

Preferably, the synthetic resinous material for forming the inner cylindrical member is selected from a group consisting of suitable thermosetting resins. Therefore, it is possible to suppress any thermal deformation when the dynamic pressure type bearings is used, thereby maintaining the accuracy of the bore diameter of the bearing to its initial state.

DETAILED DESCRIPTION OF THE PREFERRED EMBODIMENTS

Figure 1:
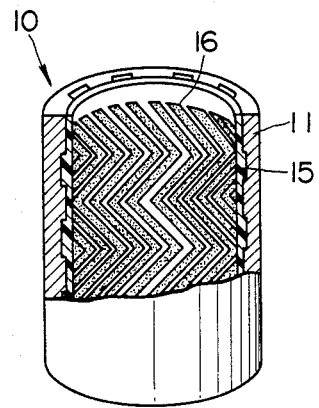
FIG. 1 is a perspective, partial cross sectional view of a dynamic pressure type slide bearing of the invention.

FIG. 1 is a perspective, partial cross sectional view of a dynamic pressure type slide bearing 10 of the present invention. In the drawing, numerals 11 and 15 denote a metallic outer cylindrical and a thin walled inner cylindrical member fabricated of synthetic resin, respectively.

On the inner face of the outer cylindrical member 11, a plurality of axial grooves 12 and circumferential grooves 13 are disposed. On the inner face of inner cylindrical member 15 a plurality of grooves of wave like contiguous pattern are formed axially in a herringbone pattern. The inner cylindrical member 15 is tightly joined to the outer cylindrical member 11 by means of synthetic resinous material entered into the recessed grooves 12 and 13, which have previously been formed on the inner face of the outer cylindrical member 11 during the moulding operation.

Figure 2:
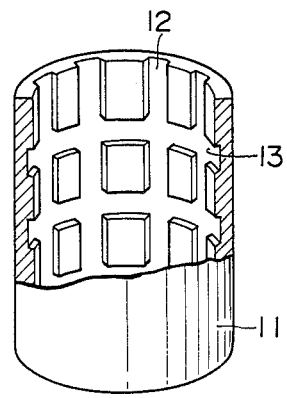
FIG. 2 is a perspective, partial cross sectional view of the outer cylindrical member of the slide bearing of FIG. 1.

Typical materials for making the outer cylindrical member 11 are aluminum or alloys thereof. For the inner cylindrical member 15, a thermosetting synthetic resinous material having good fluidity, for example, epoxy resin, is used and is moulded to have as thin a wall thickness as possible, for example, 0.2 to 2 mm. Typical thermosetting resins useful for this bearing include phenol resin, unsaturated polyester resin and diarylphthalate resin or the like. FIG. 2 shows the recessed grooves 12 and 13 formed on the inner face of the outer cylindrical member 11, the root of axially formed grooves 12 being formed to have undercuts.

In addition to the above-mentioned grooves 12 and 13, the outer cylindrical member 11 has applied to its inner face some bonding agent. Alternatively, these grooves 12 and 13 may be dispensed with and replaced with bonding agent alone.

Figure 3:
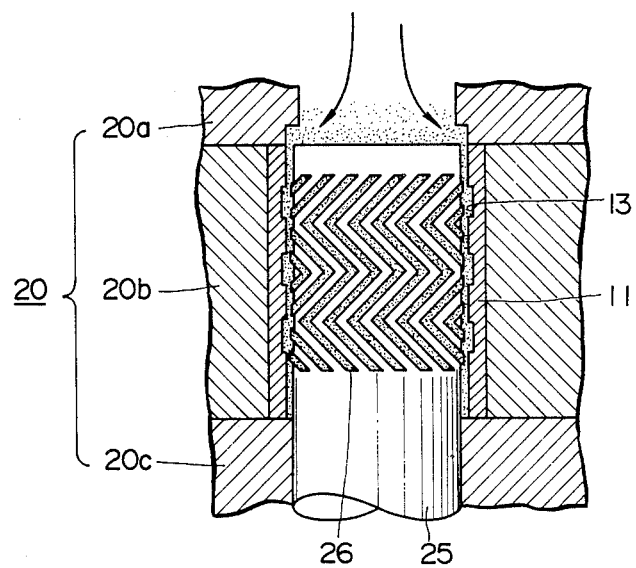
FIG. 3 is a sectional side view showing the bearing of FIG. 1 in a stage of manufacture according to the method of the present invention.
Figure 4:
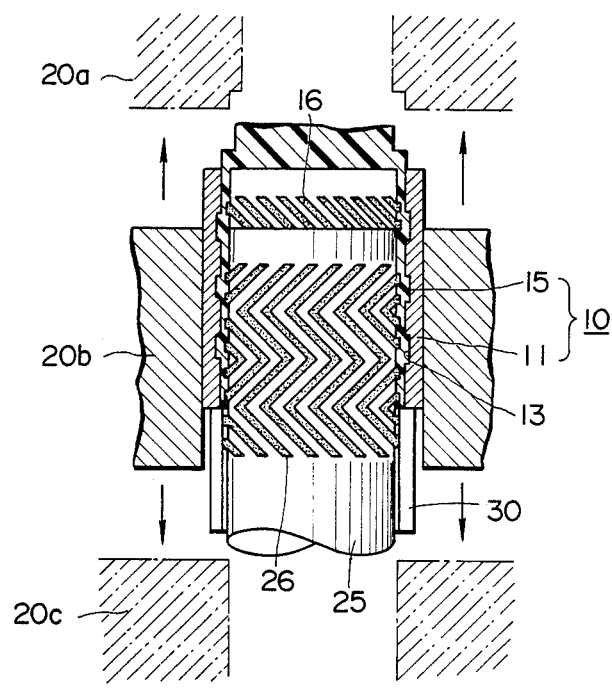
FIG. 4 is a sectional side view showing the bearing of FIG. 1 being removed from the moulds.

FIGS. 3 and 4 show one of the steps of the method for making the dynamic pressure type slide bearing of this invention. An outer mould 20 and an inner mould 25 are shown. The outer mould 20 is a split type mould consisting of three axially separable moulds, namely, an upper mould 20a, a middle mould 20b and a lower mould 20c. The outer peripheral face of the inner mould 25 is provided with a plurality of projecting ridges 26, the shape of which corresponds to that of grooves for generating dynamic pressure.

First, both the upper mould 20a and the lower mould 20c are moved axially upward and downward, respectively, and away from the middle mould 20b. Then, the metallic outer cylindrical member 11 is inserted into the middle mould 20b of the upper mould with the outer face of the outer cylindrical member 11 being kept in tight contact with the inner periphery of the middle mould 20b. Then, both the upper mould 20a and the lower mould 20c are moved back to the initial position. At this stage, an annular gap of 0.5 to 2 mm width has been formed between the outer cylindrical member 11 inserted into the middle mould 20b and the inner mould 25. The inner face of the outer cylindrical member 11 is coated with a bonding agent are effective means for joining the inner cylindrical member 15 to the outer cylindrical member 11, but these two means are not always required to be used together. At least one of them can be used. Next, the moulding material, suitably prepared by mixing synthetic resinous material, reinforcing agent and other supplemental material, is melted by heating and poured by a transfer moulding machine into the annular gap defined between the inner mould 25 and the outer cylindrical member 11. During the time of moulding, injection pressure must be held at a sufficiently high level.

FIG. 4 shows the composite bearing 10, in which the inner cylindrical member 15 formed by the solidified moulding material is integrally bonded to the outer cylindrical member 11, being parted from the forming moulds.

A plurality of grooves 16 for generating dynamic pressure are formed by means of the impressions of the ridges 26 of the inner mould 25 on the solidified moulding material of the molded resinous member (inner cylindrical member 15). The portions where this moulded resinous member (inner cylindrical member 15) contact the inner periphery of the outer cylindrical member 11 and enter into the grooves of the outer cylindrical member join the members 11, 15 along their entire faces to constitute a tight bond therebetween.

When removing the moulded bearing from the moulds, the upper mould 20a and the lower mould 20c of the mounter mould 20 are moved away from the middle mould 20b, as shown by the arrow lines in FIG. 4. An ejector pin 30 is applied to the axial edge of the bearing 10. The bearing 10 is then pulled out in an axial direction from the inner mould 25 and the middle mould 20b.

Since the inner cylindrical member 15 of the composite bearing has a thin wall thickness of 0.2 to 2 mm, the synthetic resin will solidify uniformly during moulding, with little contraction. There arise no problem of uneven wall thickness. Accordingly, it is possible to obtain bearings have virtually no variation in the dimension of the inner diameter and having high accuracy of configuration.

EXAMPLES

Table 1 below shows the results of measurements of the accuracy with respect to the dimension and configuration comparing the test bearings of the present invention with the conventional resin bearing of the prior art monolithic type.

TABLE 1

|  | variation in (inner dia.) (μm) | out of roundness (inner dia.) (μm) | cylindricity (inner dia.) (μm) |
|---|---|---|---|
| present invention (inner dia. 10 mm) wall thickness: of outer cylinder | not more than 4 | not more than 1.5 | not more than 2 |

TABLE 1-continued

|  | variation in (inner dia.) (μm) | out of roundness (inner dia.) (μm) | cylindricity (inner dia.) (μm) |
|---|---|---|---|
| (1 mm) of inner cylinder (2 mm) | | | |
| prior art | | | |
| (inner dia. 10 mm, wall thickness 2 mm) | 50 | 20 | 30 |

The example of the present invention shown in Table 1 is a composite bearing composed of an outer cylindrical member of aluminum alloy and an inner cylindrical member of carbon fiber reinforced epoxy resin.

The prior art bearing is a monolithic one fabricated of carbon fiber reinforced Nylon 12.

The bearing of the instant invention permits engineering of the amount of thermal expansion of the bearing bore diameter due to temperature rise by suitable selection of the metallic material and synthetic resinous material to be coupled with each other, each having a specific coefficient of thermal expansion.

The following is a formula expressing the correlation between the relevant thermal expansion factors obtained through experiments done in developing the present invention.

$$e = e_p - k\sqrt{\frac{1}{\Delta T^2} - \left[\left(\frac{2}{\Delta T}\right) \times \left(\frac{D}{d}\right)^2 \times \Delta e\right]}$$

where;

$e$: inner thermal expansion/°C. of the bearing bore diameter, $e_p$: linear thermal expansion/°C. of the inner cylindrical member (synthetic resin), $\Delta e$: difference in linear thermal expansion/°C. between the outer cylindrical member (metal) and the inner cylindrical member (synthetic resin), $D$: outer diameter of the outer cylindrical member (mm), $\Delta d$: inner diameter of the inner cylindrical member (mm), $\Delta T$: temperature rise (°C.)

$k$: combination faction which varies depending on the extent of joining between the outer cylindrical member and the inner cylindrical member.

From the above formula, the value e corresponding to the value T can be obtained by suitably setting e in accordance with the required design size (D and d) of the inner cylindrical member.

Consequently, it become possible to equalize the amount of expansion of the bearing bore diameter and the rotary shaft. The bearing clearance does not vary and is maintained at a constant value, even if the ambient temperature changes during the running of the bearing.

Figure 5:
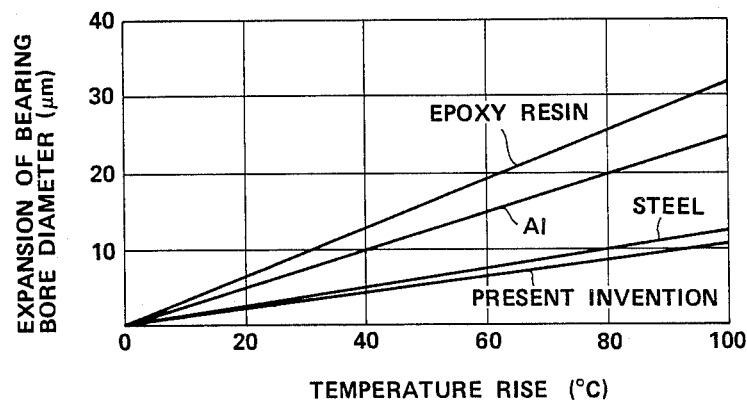
FIG. 5 is a graph showing the amount of thermal expansion of the bearing bore diameter for various types of bearings caused by temperature rise.

FIG. 5 is a graph showing the relation between the amount of expansion of the bearing inner diameter and the temperature rise. The present invention bearing has an inner diameter of 12 mm, a wall thickness of the outer cylindrical member of 1 mm, a wall thickness of the inner cylindrical member of 1 mm, and a wall thickness of the outer cylindrical member of 1 mm. It is comprised of an outer cylindrical member of aluminum alloy and an inner cylindrical member fabricated of carbon fiber reinforced epoxy resin bonded together, with the rate of expansion of the bearing bore diameter designed to be almost the same as that of steel. In the graph, the rate of expansion of an aluminum bearing is also shown for comparison.

Accordingly, when this bearing is assembled to a steel shaft, there does not arise any appreciable change in bearing clearance.

Moreover, in the dynamic pressure type bearing produced in accordance with the method of this invention, since the outer diametrical face of the inner cylindrical member is joined to a metallic outer cylindrical member by means of a bonding agent or the like, volumetric contraction at the time of solidification does not take place as a shrinkage toward the inner diametrical face. The inner diametrical face of the inner cylindrical member, rather, deforms toward the outer cylindrical member, accompanied by some decrease in wall thickness of the inner cylindrical member. The inner diametrical face, therefore, slightly expands, creating slight clearance between the inner mould and the inner cylindrical member. By virtue of this phenomenon, the bearing as moulded can be readily pulled out in the axial direction of the forming mould without causing any damage to the grooves for generating desired dynamic pressure formed on the bore face of the bearing, both the inner cylindrical member and the outer cylindrical member being bonded together to constitute a laminated construction.

WORKING EXAMPLES I

The outer cylindrical member and inner cylindrical member, respectively, were prepared by using aluminum alloy (JIS 5052) and epoxy resin containing 20% of carbon fiber and 50% of silica grains. The wall thicknesses of the outer cylindrical member and the inner cylindrical member, respectively, were 1 mm and 0.7 mm, and the bearing bore diameter was 10 mm.

On the outer face of the inner mould, projecting ridges of 5 μm height corresponding to the configuration of the grooves for generating dynamic pressure were formed.

The outer cylindrical member, the inner face thereof having been coated with a bonding agent of polybenzimidal series and then dried, was inserted onto the inner face of the outer mould of the forming mould.

The moulding material, after having been melted by heating, was injected by means of a transfer moulding machine.

The internal pressure and the temperature of the mould were set at 300 Kgf/cm² and 170° C., respectively. The moulds were opened after time periods of 5 second for injection, pressure holding of 55 seconds and curing time of 60 seconds had elapsed. Thereafter, an ejector pin was applied to the mould in an axial direction to pull out the formed bearing. The moulded bearing was easily removably, and the grooves formed on the bearing bore face proved to be free from any harmful damage.

Next, an explanation will be made of the results of tests conducted to compare the durability of the bearing according to the present invention with that of a monolithic bearing made of synthetic resin. The bearing according to the present invention used for the test was that provided for the aforesaid production test. The conventional bearing used for this test was made of polyacetal resin, which has better sliding properties than polyamide resin, made to the same specifications as the bearing of this invention.

Table 2 shows dimensional accuracy and shape accuracy with respect to the bearing bore face.

TABLE 2

|  | out of roundness of inner diameter (μm) | cylindricity of inner diameter (μm) | bearing clearance (μm) |
| --- | --- | --- | --- |
| Bearing of this Invention | 1.5 | 2 | 10 |
| Prior Art Bearing | 15 | 27 | 70 |

Test condition of this durability test were as follows:
Radial Load                           1 Kgf/Cm
Peripheral Speed of the Shaft (steel)  10 m/min
Ambient Temperature                   70° C.
Lubricants                            grease Torque on the shaft during the rotation was continuously measured and the coefficient of kinetic friction of the bearing was calculated from the measured values listed above. The durability of the test bearing was evaluated by whether or not the test sample showed an abrupt rise in its coefficient of kinetic friction.

Figure 6:
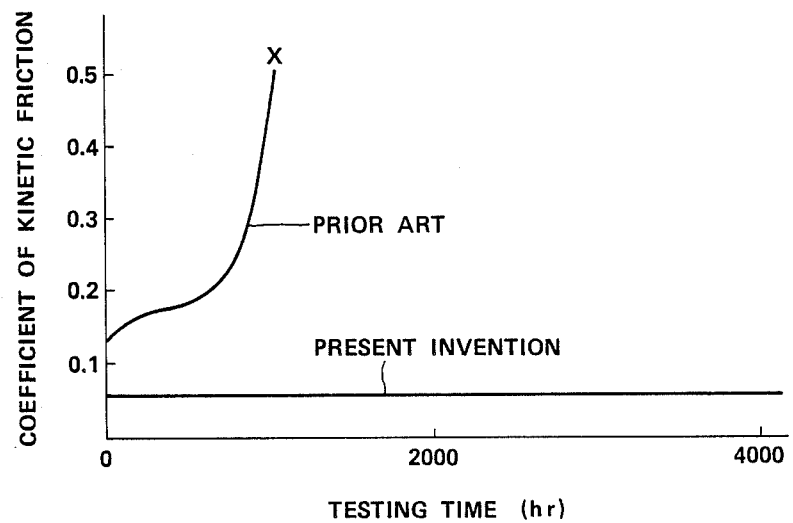
FIG. 6 is a comparative graph showing the change of the coefficient of kinetic friction for the prior art bearing and the bearing of the instant invention.

FIG. 6 shows the relations between the coefficient of kinetic friction and the test time. As can be clearly seen from the graph, the bearing of the present invention has a service life more than ten times longer than that of the prior art bearing.

The reason why such remarkable results can be attained is attributable to the fact that both the dimensional accuracy and the configurational accuracy of the bearing of the present invention are far superior to those of the prior art bearing.

Figure 7:
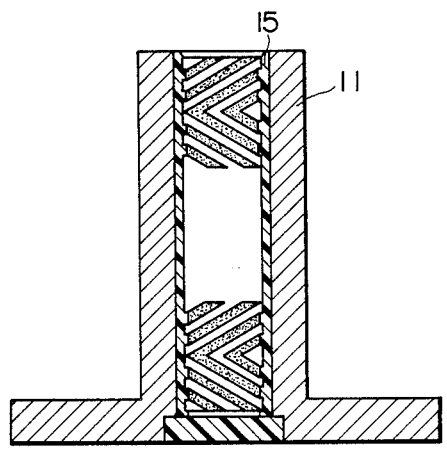
FIG. 7 is a section side view showing a stage of manufacture, wherein a thin walled inner cylindrical member is directly formed by transfer moulding on the inner bore of the outer cylindrical member which also acts as a housing.

The bearing of this invention enables use with a small bearing clearance gap, while the prior bearing must be used with a large bearing clearance gap. The large gap gives rise to insufficient action of the dynamic pressure generating grooves in retaining lubricants, giving rise to improper lubrication, resulting in wear of bearing bore face and consequent rise of torque, eventually resulting in inability to continue further rotation. Other Examples FIG. 7 shows another example, wherein a thin walled inner cylindrical member 15 is directly formed by transfer moulding on the inner peripheral face of an outer cylindrical member 11 which also acts as a housing. In this case, the inner peripheral face of the housing has previously been coated with a bonding agent of the polyimid series and then dried. After having completed the moulding operation, post curing was done so as to completely solidify the applied bonding agent.

This method of forming saves the assembly work of putting the bearing into a housing. It can also make two bearings in a single inner mould. Therefore, the two bearing portions, namely, an upper bearing and a lower bearing, can be formed with very good alignment therebetween.

Figure 8:
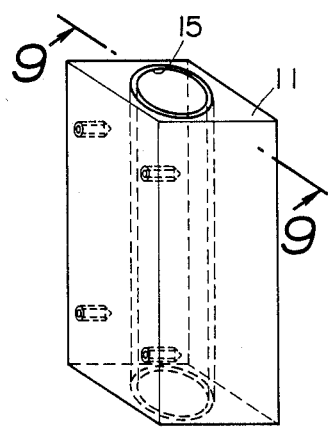
FIG. 8 is a perspective view of a dynamic pressure type slide bearing particularly applicable to linear motion.
Figure 9:
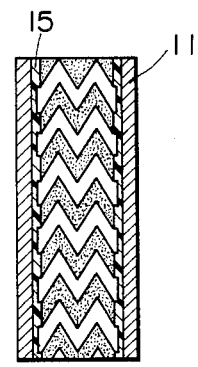
FIG. 9 is a sectional side view taken along line 9—9 of FIG. 8.

FIGS. 8 and 9 show another example in which a thin walled inner cylindrical member 15 is directly formed by way of transfer moulding on the inner face of an outer cylindrical member which is also used as a mounting housing. This example shows, particularly, that the method of the present invention can be applied to a dynamic pressure type slide bearing for linear motion.

The slide bearing made according to the method mentioned above has high dimensional accuracy and can be used with a smaller degree of bearing clearance, thereby assuring a sufficient supply of oil film, which prevents stick slip from occurring.

The exterior shape of the metal structural member used is not limited to a circular cylinder or a cubic one, but it can be any other such shape as can be formed by die casting using aluminum alloys.

As explained above, an inner cylindrical member made of synthetic resinous material having a plurality of grooves for generating dynamic pressure can be integrally joined at the time of moulding to the interior of a metal outer cylindrical member by means of a suitable bonding agent or the like. Accordingly, it is possible, according to the present invention, to make the bearing bore diameter of a slide bearing with a higher degree of accuracy with respect to both dimension and configuration as compared with other prior art dynamic pressure type monolithic slide bearings of synthetic resin. A small bearing clearance is feasible, and the slide bearing of this invention displays better accuracy in bearing run-out, higher load carrying capacity, less extent of torque and superior durability and longer service life.

In addition, since the rate of the thermal expansion of the bearing bore diameter can be freely set by suitably selecting the coefficients of thermal expansion of the metallic material of the outer cylindrical member and synthetic resinous material of the inner cylindrical member to be coupled thereto, it has become possible to produce a slide bearing rate of expansion which is the same as that of the shaft to be received by the bearing. Further, it has also become possible to maintain the bearing clearance constant regardless of changes in ambient temperature during the use of bearing.

Moreover, according to the present invention, since the bearing bore slightly expands to form a slight extent of clearance between the inner cylindrical member and the inner mould when the thermosetting resin solidifies during moulding, it is possible to pull the moulded bearing out of the mould in an axial direction without causing any appreciable damage to the grooves for generating dynamic pressure formed on the bearing bore face during moulding.

I claim:

1. A method of manufacturing a dynamic pressure type slide bearing, the bearing comprising an outer cylindrical member and an inner cylindrical member having been formed on the inner peripheral face thereof with a plurality of grooves for generating dynamic pressure and fixedly joined to the inner peripheral face of the outer cylindrical member, the method comprises the steps of:

inserting the outer cylindrical member, having previously been applied with a joining means, into an outer mould, injecting melted moulding material of synthetic resin into an annular gap defined between an inner mould and the outer cylindrical member, the outer cylindrical member having been inserted into the outer mould, the outer peripheral face of the inner mould having a plurality of projecting ridges corresponding to the grooves for generating dynamic pressure;

solidifying the injected moulding material to form the inner cylindrical member, the inner cylindrical member being fixedly joined to the outer cylindrical member during the solidifying, the inner cylindrical member expanding away from the inner mould during the solidifying, the inner cylindrical member and the outer cylindrical member constituting a composite slide bearing having an integrally joined laminated construction; and removing the composite slide bearing from both the outer mould and inner mould by axially moving the composite slide bearing away from the inner mould and the outer mould.

2. A method of manufacturing a dynamic pressure type slide bearing as claimed in claim 1, wherein the inner peripheral face of said outer cylindrical member has previously been applied with adhesives as a bonding agent.

3. The method of manufacturing the dynamic pressure type slide bearing of claim 2, wherein said adhesives are selected from thermosetting synthetic resins.

4. A method of manufacturing a dynamic pressure type slide bearing as claimed in claim 1, wherein a plurality of grooves are formed on the inner peripheral face of said outer cylindrical member as joining sense.

5. A method of manufacturing a dynamic pressure type slide bearing as claimed in claim 1, wherein said inner peripheral face of said outer cylindrical member is formed with a plurality of grooves as joining means and also applied with adhesives as bonding agent.

6. A method of manufacturing a dynamic pressure type slide bearing having an outer cylindrical member and a thin walled inner cylindrical member, the method comprising:

inserting an outer cylindrical member into an outer mould, the outer cylindrical member having an inner peripheral face;

injecting molten synthetic resin into an annular gap defined between an inner mould and the outer cylindrical member, the outer peripheral face of the inner mould being provided with a plurality of projecting ridges corresponding to grooves for generating dynamic pressure;

forming the inner cylindrical member by solidification of the injected moulding material, the inner cylindrical member becoming fixedly joined to the outer cylindrical member as the solidification occurs, the fixedly joining of the inner cylindrical member to the outer cylindrical member causing the inner cylindrical member to deform and expand away from the inner mould and toward the outer cylindrical member, the inner cylindrical member and the outer cylindrical member constituting a composite slide bearing having an integrally joined laminated construction; and removing the composition slide bearing from both the outer mould and inner mould by axially moving the composite slide bearing away from the moulds.

7. The method of manufacturing the dynamic pressure type slide bearing of claim 6, further comprising the step of coating the inner peripheral face of the outer cylindrical member with an adhesive bonding agent prior to the insertion of the outer cylindrical member into the outer mould.

8. The method of manufacturing the dynamic pressure type slide bearing of claim 6, wherein the synthetic resin is a thermosetting synthetic resin.

9. The method of manufacturing the dynamic pressure type slide bearing of claim 8, wherein the thermosetting synthetic resin is epoxy resin.

10. The method of manufacturing the dynamic pressure type slide bearing of claim 8, wherein the thermosetting synthetic resin is phenol resin.

11. The method of manufacturing the dynamic pressure type slide bearing of claim 8, wherein the thermosetting synthetic resin is unsaturated polyester resin.

12. The method of manufacturing the dynamic pressure type slide bearing of claim 8, wherein the thermosetting synthetic resin is diarylphthalate resin.

13. The method of manufacturing the dynamic pressure type slide bearing of claim 6, wherein said inner peripheral face of said outer cylindrical member is applied with an adhesive bonding agent as means for fixedly joining the inner cylindrical member to the outer cylindrical member.

14. The method of manufacturing the dynamic pressure type slide bearing of claim 6, wherein a plurality of grooves are formed on the inner peripheral face of the outer cylindrical member as means for fixedly joining the inner cylindrical member to the outer cylindrical member.

* * * * *